Patented Aug. 17, 1937

2,090,594

UNITED STATES PATENT OFFICE 2,090,594

ACYL UREAS AND PROCESS FOR THE PREPARATION THEREOF

Ralph A. Jacobson, Wilmington, Del., assignor to E. I. du Pont de Nemours & Company, Wilmington, Del., a corporation of Delaware No Drawing. Application January 24, 1936, Serial No. 60,706

14 Claims. (Cl. 260—33)

This invention relates to acyl ureas and to a process for the preparation thereof.

Certain acyl ureas have previously been prepared. For example, barbituric acid is ordinarily prepared by condensing urea with malonic ester derivatives by means of sodium ethylate. Acetyl urea is another known acyl urea.

It is an object of the present invention to provide a new and improved process for the preparation of acyl ureas. A further object is the provision of a process for the preparation of acyl ureas in which readily available raw materials are employed. An additional object is to produce new and useful acyl ureas. A more specific object is to produce new and useful diureides. Other objects will appear hereinafter.

These objects are accomplished in accordance with the present invention by reacting an alkali metal urea with an ester of a carboxylic acid. The resultant product is an acyl urea, the acyl radical being that present originally in the carboxylic acid.

In practising the invention, it is preferable to carry out the reaction in one of two ways: namely, either in the presence of a catalyst such as, for example, acetone, or by forming the sodium urea in situ in liquid ammonia in the presence of the ester.

The invention will be further illustrated but is not limited by the following examples, in which the quantities given, unless otherwise indicated, are in parts by weight.

Example I

Acetyl urea

A mixture of 880 grams (10 mols) of ethyl acetate, 735 cc. (10 mols) of acetone and 410 grams (5 mols) of sodium urea was placed in a five-liter flask. The mixture was stirred for one hour, during which period considerable heat was developed and a thick precipitate formed. After three hours, the supernatant liquid was decanted off and the solid cooled externally with a freezing mixture. The contents of the reaction vesel were then treated gradually with 300 cc. of 18% hydrochloric acid. Crystalline acetyl urea was obtained which, upon recrystallization from hot water, gave 193 grams of pure acetyl urea melting at 214° C.

Example II

Benzoyl urea

To 136.1 parts of methyl benzoate were added 82.1 parts of sodium urea and 58.1 parts of acetone. The mixture was stirred vigorously for approximately four hours, allowed to stand overnight, and then treated with 500 parts of water containing 36.5 parts of hydrogen chloride. The crystalline precipitate was filtered, washed on the filter with water and purified by crystallization from hot alcohol. The product obtained melted at 210°–212° C. The melting point for pure benzoyl urea is 215° C.

Example III

Oleyl urea

Ten (10) parts of sodium urea were added to a solution of about 12 parts of acetone in 57 parts of methyl oleate, the mixture vigorously stirred, allowed to stand overnight, then acidified with dilute acetic acid, and filtered. The product obtained after purification by crystallization from hot alcohol melted at 150°– 155° C. Pure oleyl urea melts at 160° C.

Example IV

Methacrylyl urea

The synthesis of methacrylyl urea was carried out in the cold in a vessel equipped with a stirrer driven by a fairly powerful motor. A five-liter flask was surrounded by an ice bath, and a mixture of 2400 grams (24 mols) of methyl methacrylate, 656 grams (8 mols) of sodium urea and 600 cc. of acetone was added, with vigorous stirring, over a period of three hours, the temperature being kept at 8°–12° C. The mixture thickened considerably and acquired a yellow color. The flask was immediately packed in a freezing mixture and 1520 cc. of 18% hydrochloric acid was added, with stirring, at such a rate as not to raise the temperature about 25° C. The slightly acid mixture was then cooled to 2° C. with stirring, and the acyl urea separated by suction filtration. The upper oily layer in the filtrate weighed 1980 grams and contained most of the excess methyl methacrylate. The methacrylyl urea was washed with several small portions of alcohol and recrystallized from 1300 cc. of alcohol. After cooling to 0° C., the alcoholic solution yielded 343 grams of pure white crystalline methacrylyl urea melting at 132°–134° C. Evaporation of the alcoholic mother liquor under reduced pressure gave an additional 41 grams of methacrylyl urea, making a total yield of 37.5%.

The following example illustrates the preparation of methacrylyl urea by forming the sodium urea in situ in liquid ammonia in the presence of the ester. Suitable condensation in this case is obtained without the use of a catalyst.

EXAMPLE V

Methacrylyl urea

To a solution of 200 parts of methyl methacrylate and 120 parts of urea in about 623 parts of liquid ammonia was added 46 parts of sodium metal over a period of three hours. The mixture was allowed to stand for a few hours at about 15° C., during which time practically all the ammonia evaporated off. The residue in the flask was taken up with a small amount of water, the clear solution acidified at about 25° C. with hydrochloric acid, cooled, and the precipitate filtered. The product was purified by crystallization from hot water. The identity of the product was established by a nitrogen determination.

The product prepared as described above polymerizes readily upon heating alone or in the presence of a polymerization catalyst, e. g., benzoyl peroxide.

EXAMPLE VI (A)

Acyl urea from coconut oil

A mixture of 300 parts of coconut oil, about 160 parts of acetone and 100 parts of sodium urea was stirred vigorously for about five minutes, then about 400 parts of additional acetone were added, and stirring continued for about one-half hour. The mixture was allowed to stand overnight, water was added, and the product filtered. The product was dispersed in warm alcohol, filtered, and then purified by crystallization from acetic acid. A snow-white crystalline waxy solid melting at 172° C. was obtained.

The acyl urea of coconut oil may also be synthesized by forming the sodium urea in situ in the presence of the ester. Condensation in this case proceeds satisfactorily without a catalyst, as exemplified below:

EXAMPLE VI (B)

Acyl urea from coconut oil

A mixture of 60 parts of urea and 213 parts of coconut oil was dissolved in about 930 parts of liquid ammonia and to this mixture were added slowly 23 parts of metallic sodium. The clear solution was allowed to stand overnight, during which time most of the ammonia evaporated off. Water was added, the mixture acidified with acetic acid, the precipitate filtered, and the product purified by repeated crystallization from acetic acid. The purified product melted at 168°–171° C.

EXAMPLE VII

Acyl urea from linseed oil

Ten (10) parts of sodium urea were added, with stirring, to a mixture of 16 parts of acetone and 59 parts of raw linseed oil, then 4 parts more of acetone were added and the mixture stirred for ten minutes. After standing overnight, the product was taken up with water, acidified with hydrochloric acid, the water decanted off the precipitate, and the product purified by crystallization from hot alcohol. The product obtained melted at 154°–158° C. and had an iodine number of 128.

EXAMPLE VIII

Acyl urea from China-wood oil

To a mixture of 12 parts of acetone and 59 parts of China-wood oil were added, with stirring, 10 parts of sodium urea. The mixture was allowed to stand overnight. The product in the flask was taken up with water, the mixture acidified with hydrochloric acid, filtered, and the precipitate washed with hot alcohol. The product obtained after repeated crystallizations from toluene melted at 150°–160° C. and had an iodine number of 108.8. Analysis of the product showed it to contain 8.13% nitrogen, whereas the theoretical nitrogen content of eleostearyl urea is 8.97%.

The process of this invention is also applicable to esters of dibasic acids to form compounds of two classes:

(1) With malonic acid esters or with substituted malonic acid esters, ring closure occurs to yield barbituric acid and substituted barbituric acids. Thus, malonic ester yields barbituric acid, while ethyl malonic ester, isopropyl malonic ester and butyl malonic ester yield ethyl barbituric acid, isopropyl barbituric acid and butyl barbituric acid, respectively.

(2) With esters of aliphatic dicarboxylic acids containing more than one carbon atom between the carboxyl groups, diureides are obtained. Thus, diethyl glutarate reacts with two mols of sodium urea to give glutaryl diureide.

$$2NaNHCONH_2 + C_2H_5OOC(CH_2)_3COOC_2H_5 \rightarrow$$

The above features of the invention are illustrated by the following examples:

EXAMPLE IX

Barbituric acid

To a solution of 8.8 parts of acetone in 40 parts of malonic ester were added 10 parts of sodium urea. The mixture was allowed to stand at room temperature for several days, water added, and then acetic acid until slightly acid to litmus. The white precipitate was filtered off, dissolved in 40 parts of hot water, acidified with hydrochloric acid, and the precipitate filtered. The product obtained was purified by crystallization from alcohol, and analysis showed it to contain 17.48% nitrogen, whereas the theoretical nitrogen content of barbituric acid dihydrate is 17.07%.

EXAMPLE X

Butyl barbituric acid

To a solution of 8.8 parts of acetone in 43 parts of n-butyl malonic ester were added, with stirring, 10 parts of powdered sodium urea. The mixture was stirred for one-half hour, allowed to stand at room temperature for several days, treated with a small amount of water, and then filtered. The precipitate was dissolved in water, acidified and filtered. The product obtained after purification by crystallization from alcohol melted at 208° C. and contained 14.8% nitrogen, whereas the theoretical quantity of nitrogen in butyl barbituric acid is 15.2%.

EXAMPLE XI

Ethyl barbituric acid

To a solution of 8.8 parts of acetone in 38 parts of ethyl malonic ester were added, with stirring, 10 parts of sodium urea, and the mixture was stirred for about fifteen minutes. After standing for several days at room temperature, the product in the flask was taken up with a small amount of water, acidified with hydrochloric acid, and the precipitate filtered. The product obtained after

Example XII

Isopropyl barbituric acid

To a solution of 8.8 parts of acetone in 40 parts of isopropyl malonic ester were added 10 parts of sodium urea. The mixture was stirred for fifteen minutes and allowed to stand at room temperature for several days. To the product in the flask was added a small amount of water, the mixture acidified and filtered. The product obtained was purified by crystallization from alcohol and found to melt at 212° C., which is the known melting point for isopropyl barbituric acid.

Example XIII

Glutaryl diureide

To a mixture of 20 parts of sodium urea, 20 parts of acetone and 23 parts of ethyl glutarate were added 20 parts of additional acetone, and the resultant mixture was allowed to stand at room temperature for twenty-four hours. The mixture was then taken up with a small amount of water, the mass acidified with hydrochloric acid, the precipitate filtered and purified by crystallization from hot acetic acid. The white crystalline product obtained melted at 247°–248° C., and analysis showed it to contain 24.6% nitrogen, whereas the calculated nitrogen content of glutaryl diureide is 25.95%.

Example XIV

Pimelyl diureide

A mixture of 21.6 parts of ethyl pimelate, 16 parts of sodium urea and 20 parts of acetone was allowed to stand overnight. The product in the flask was taken up with a small amount of water, then acidified with hydrochloric acid, and the precipitate filtered. The product obtained after purification by crystallization from hot acetic acid melted at 240°–245° C.

Example XV

Ethyl allophanate

To a mixture of 10 parts of diethyl carbonate and 14 parts of sodium urea were added 20 parts of acetone, and the mixture was stirred for several minutes. The reaction mixture was cooled with ice water, an additional 12 parts of acetone added, and allowed to stand overnight at room temperature. The semi-solid brown paste was diluted with water, acidified with acetic acid, filtered, and the precipitate purified by crystallization from hot alcohol. The white crystalline solid obtained melted at 190° C. and was identified as ethyl allophanate. Analysis of the product obtained showed it to contain 21.82% nitrogen, whereas the theoretical nitrogen content of ethyl allophanate is 21.2%.

Similarly, the process of the invention may be applied to the treatment of other esters of mono- or polycarboxylic acids. As further examples of such esters may be mentioned propyl acetate, butyl acetate, ethyl propionate, ethyl isobutyrate, ethyl laurate, ethyl undecylenate, ethyl abietate, amyl acetate, lauryl acetate, glycol laurate, stearyl oleate, ethyl levulinate, butyl levulinate, methylricinoleate, amyl benzoate, diethylene glycol phthalate, di(butoxyethoxyethyl)-phthalate, ethyl succinate, propyl maleate, hexyl malonic ester, esters of heterocyclic acids such as pyridine carboxylic acids and quinolinic acid, esters of carboxylic acids corresponding to the higher alcohols obtainable in the synthesis of methanol from carbon monoxide and hydrogen, and carboxylic acid esters of said alcohols as described, for example, in U. S. Patent No. 2,015,077.

As illustrated by the examples, the process is applicable to the preparation of acyl ureas by the reaction of glycerides of fatty acids, e. g., coconut oil, linseed oil and China wood oil, with sodium urea. Similarly, other oils, fats and waxes may be employed, such as, for example, alfalfa seed oil, hempseed oil, Perilla oil, poppyseed oil, rubberseed oil, sunflowerseed oil, cottonseed oil, kapokseed oil, corn oil, castor oil, teaseed oil, rapeseed oil, pumpkinseed oil, apricot kernel oil, sesame oil, olive oil, palm oil, sperm oil, neat's-foot oil, palm nut oil, cod liver oil, lard oil, menhaden oil, sardine oil, candelilla wax, Chinese vegetable tallow, japan wax, carnauba wax, spermaceti and wool grease.

In place of monosodium urea, polyalkali metal ureas such as disodium urea and the corresponding potassium ureas may be employed.

When the reaction is carried out by the formation of sodium urea in situ in liquid ammonia in the presence of carboxylic acid ester, suitable condensation is often obtained without the use of a catalyst. This is illustrated, for instance, in Examples V and VI. Otherwise, for practical purposes it is desirable to employ a catalyst. The use of acetone as a catalyst has given especially desirable results. As further examples of catalysts may be mentioned, methyl ethyl ketone, dipropyl ketone, methyl propyl ketone, dibutyl ketone, and ethyl propyl ketone. In general, the preferred catalysts are ketone catalysts. Likewise in the process where the sodium urea is not formed in situ in liquid ammonia, alcohols, for example, ethyl alcohol, tertiary amyl alcohol, the higher alcohols from the methanol synthesis, propyl alcohol, butyl alcohol, isobutyl alcohol, and amyl alcohol may be employed as catalysts. It will be apparent that such catalysts may also function as a solvent or diluent.

The proportions of the various materials employed in carrying out the reaction will vary with the reactants employed and the products desired. For instance, by reacting together monosodium urea and a monocarboxylic acid ester in substantially chemically equivalent proportions a monoacyl urea is obtained. By reacting one molecular proportion of disodium urea with two molecular proportions of the ester, a diacyl urea may be obtained. Usually, in preparing polyacyl derivatives it is preferable to first form the monoacylated derivative, then convert the monoacylated derivative to its alkali metal salt, and finally react this salt with another molecular proportion of the ester. Similarly, in the reaction of monosodium urea with malonic esters to form barbituric acids, substantially equimolar proportions are satisfactory. However, in the preparation of diureides from esters of higher aliphatic dicarboxylic acids, I employ generally two mols of the ester for each mol. of sodium urea.

A number of the diureides described herein are new compounds. These diureides are obtained from esters of acids having the general formula:

$$HOOC(CH_2)_nCOOH$$

and may, per se, be expressed comprehensively by the general formula:

$$NH_2CONHCO(CH_2)_nCONHCONH_2$$

$n$ in both formulas being an integer having a value of at least 3.

In order to produce more complex polyacylated polyureides, diureides of the above type may be converted to the alkali metal derivatives and the latter further reacted with carboxylic acid esters.

The temperatures and pressures of reaction are subject to variation. Usually, it is desirable to conduct the reaction at temperatures as low as practicable. For instance, in most cases, temperatures within the range of $-40°$ C. when liquid ammonia is used as the reaction medium, to $50°$ C. have been employed. Higher or lower temperatures may in some cases be used. Ordinarily the reaction is effected under atmospheric pressure, but sub-atmospheric and super atmospheric pressures may be used.

The invention provides a new and useful method for the synthesis of all types of acyl ureas both open and closed chain. Among the latter are barbituric acid and substituted barbituric acids, which products are highly useful as hypnotics. Among the former are a new group of diureides. The processes of this invention are particularly valuable in connection with the preparation of long chain acyl ureas, especially those obtained by the direct reaction of sodium urea with naturally occurring oils fats and waxes (fatty acid glycerides). No pretreatment of the fatty oil, for example, saponification, is necessary to obtain directly long chain compounds which are useful as wetting and dispersing agents or as intermediates in the synthesis of wetting and dispersing agents, wax substitutes, moisture-proofing agents and sizing agents for paper, cloth and the like. By this new and relatively simple reaction, it is possible to obtain a great variety of acyl ureas from natural oils, fats and waxes. These products are also new.

The invention is therefore particularly advantageous in providing new and useful products and a new and improved method of producing well known products such as barbituric acid and derivatives thereof, from readily available raw materials.

The present application is not concerned with the preparation of acyl ureas from alkali metal ureas and acyl or aralkyl halides, which process is described in my co-pending application Serial No. 60,705 filed of even date herewith. So much of the present application as relates to the preparation of methacrylyl ureas and polymers thereof is claimed in my co-pending application Serial No. 60,739 filed of even date herewith. So much of the present application as relates to the new and improved acyl ureas obtained from naturally occurring oils, fats and waxes is claimed in my co-pending application Serial No. 60,707 filed of even date herewith.

As many apparently widely different embodiments of this invention may be made without departing from the spirit and scope thereof, it is to be understood that I do not limit myself to the specific embodiments thereof except as defined in the appended claims.

I claim:

1. The process of preparing acyl ureas which comprises reacting an alkali metal urea with an ester of a carboxylic acid.

2. In a process of producing acyl ureas by the reaction of sodium urea with an ester of a carboxylic acid, the step which comprises forming the sodium urea in situ in liquid ammonia in the presence of the ester.

3. The process of producing acyl ureas which comprises reacting sodium urea with an ester of a carboxylic acid in the presence of a ketone as a catalyst.

4. The process of producing acyl ureas which comprises reacting sodium urea with an ester of a carboxylic acid in the presence of acetone.

5. The process of producing acyl ureas which comprises reacting sodium urea with an ester of a carboxylic acid.

6. The process of producing acyl ureas which comprises reacting sodium urea with an ester of a monocarboxylic acid.

7. The process of producing acyl ureas which comprises reacting sodium urea with glycerides of fatty acids.

8. The process of producing acyl ureas which comprises reacting sodium urea with an ester of a polycarboxylic acid.

9. The process of producing cyclic acyl ureas which comprises reacting sodium urea with an ester of an acid selected from the class consisting of malonic acid and alkyl malonic acids.

10. The process of producing barbituric acid which comprises reacting sodium urea with an ester of malonic acid.

11. The process of producing diureides which comprises reacting sodium urea with an ester of an aliphatic dicarboxylic acid containing a chain of more than one carbon atom between the ester groups.

12. A polyureide of a dicarboxylic acid of the formula $$HOOC(CH_2)_nCOOH$$

wherein $n$ is an integer having a value of at least three.

13. A diureide having the general formula $$NH_2CONHCO(CH_2)_nCONHCONH_2$$

where $n$ is an integer having a value of at least three.

14. Glutaryl diureide.

RALPH A. JACOBSON.

CERTIFICATE OF CORRECTION.

Patent No. 2,090,594.                                                        August 17, 1937.

RALPH A. JACOBSON.

It is hereby certified that error appears in the printed specification of the above numbered patent requiring correction as follows Page 1, second column, line 39, for the word "about" read above; page 4, first column, line 28, after "oils" insert a comma; and that the said Letters Patent should be read with these corrections therein that the same may conform to the record of the case in the Patent Office.

Signed and sealed this 5th day of October, A. D. 1937.

Henry Van Arsdale (Seal)                                                                       Acting Commissioner of Patents.